March 16, 1965  C. G. B. BERGLING  3,173,185
CUTTING DEVICE FOR LIGHT WEIGHT CONCRETE
Filed Aug. 15, 1962  3 Sheets-Sheet 1

Inventor
C.g.B. Bergling

By Pierce, Scheffler + Parker
Attorneys

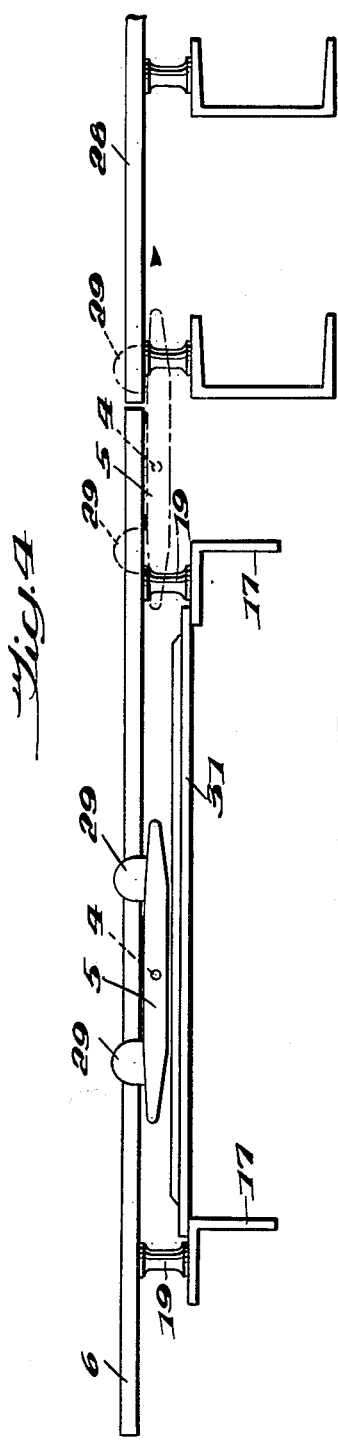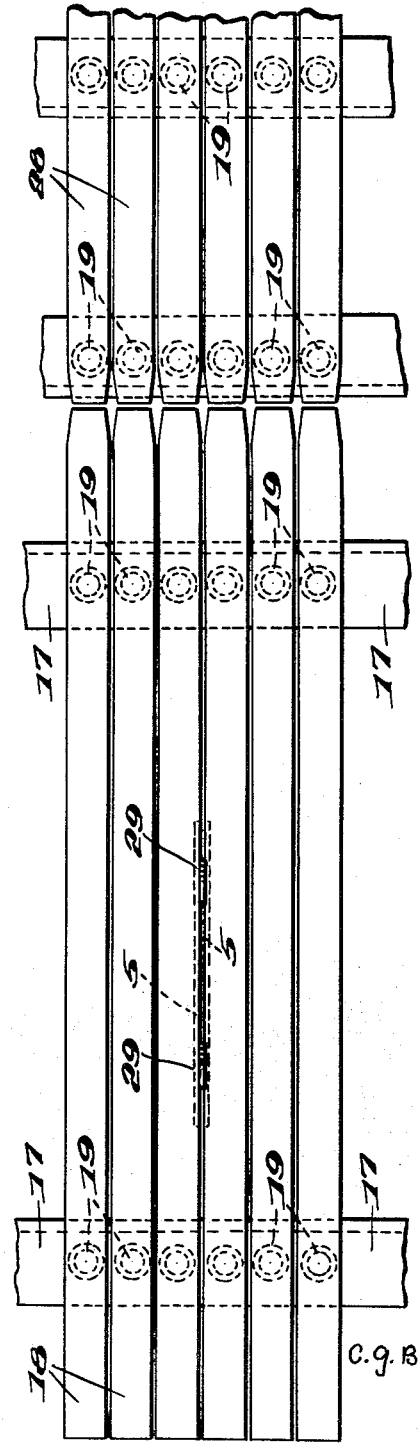

March 16, 1965  C. G. B. BERGLING  3,173,185
CUTTING DEVICE FOR LIGHT WEIGHT CONCRETE
Filed Aug. 15, 1962  3 Sheets-Sheet 3
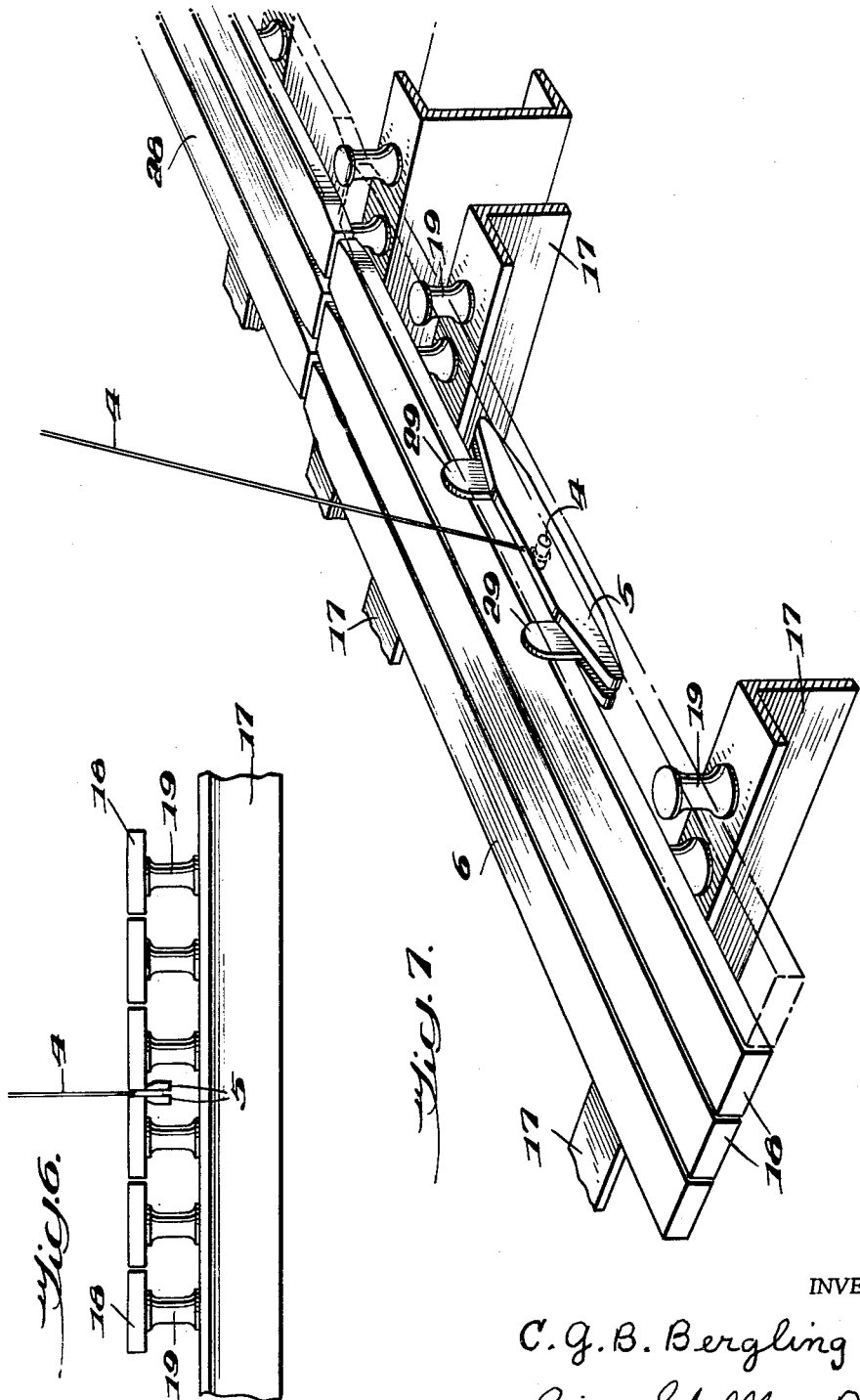
INVENTOR
C. G. B. Bergling
BY Pierce, Scheffler & Parker
ATTORNEYS

United States Patent Office 3,173,185
Patented Mar. 16, 1965

3,173,185
CUTTING DEVICE FOR LIGHT WEIGHT
CONCRETE
Charles Gunnar Birger Bergling, Rostagatan 20,
Örebro, Sweden
Filed Aug. 15, 1962, Ser. No. 217,076
Claims priority, application Sweden, Aug. 15, 1961,
8,244/61
1 Claim. (Cl. 25—105)

The present invention relates to a device for cutting light-weight concrete blocks to smaller units. The cutting device is of the type in which the block is cut while still on the mould bottom which consists of a plurality of laths or ribs spaced in such a manner that a cutting wire may be inserted between the ribs, one end of the wire being attached to a holder or runner provided to move beneath the bottom ribs.

In arrangements hitherto known of the said type the handling of the wires and wire holders has caused much trouble, since it has been necessary before starting the cutting to introduce the holders in the right place beneath the bottom ribs of the mould, so that each wire was inserted in the appertaining slot between two bottom ribs.

In accordance with the present invention this drawback is eliminated by permitting the wire holders to slide in a bracket or fixture provided adjacent to that end of the mould bottom, where the cutting is completed. The wire holders are allowed to remain in the said fixture while the mould bottom with the cut up block is removed and a new mould bottom is inserted, making it possible immediately to start cutting the new light-weight concrete block, since the wire holders are in their right position for the cutting operation.

The device according to the invention is characterized in that it comprises two fixtures, each consisting of a plurality of ribs disposed principally in the same manner as the ribs in the mould bottom, the fixtures being provided at opposite ends of the mould bottom in such a manner that the ribs in the fixtures form extensions of the ribs in the mould bottom, thus permitting the wire holders after a light-weight concrete block has been cut into smaller units, to be transferred from the mould bottom to one fixture, where they remain in a mutually unchanged position until the cutting of the following light-weight concrete block is to take place.

The fixtures may be arranged stationary, in which case the mould bottom with the block to be cut is inserted between the fixtures with the smallest play possible. However, it is suitable to make the fixtures movable in such a manner that they may be swung aside when a mould bottom is inserted into and removed from the cutting device.

Figure 1:
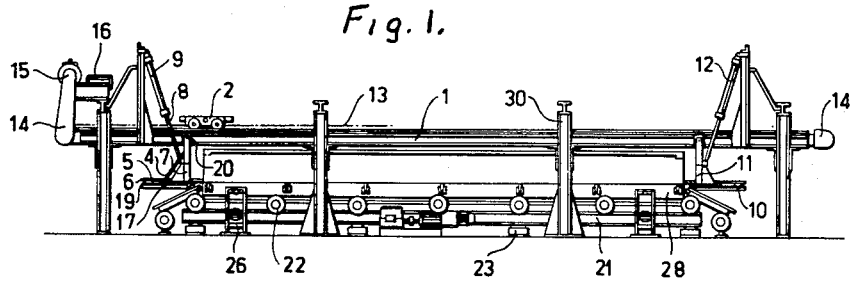
Figure 2:
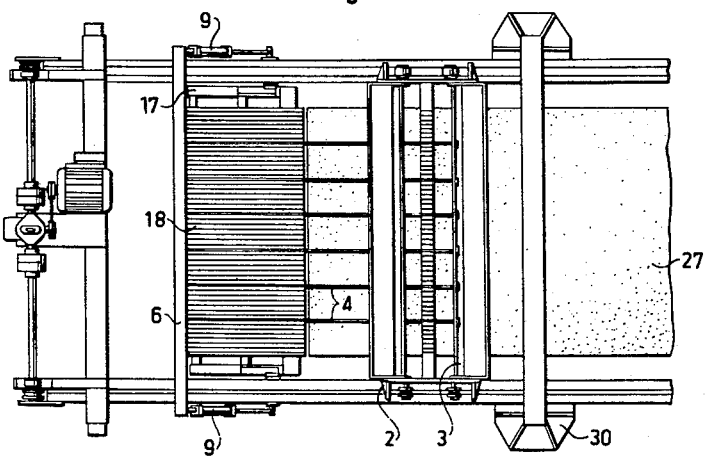
Figure 3:
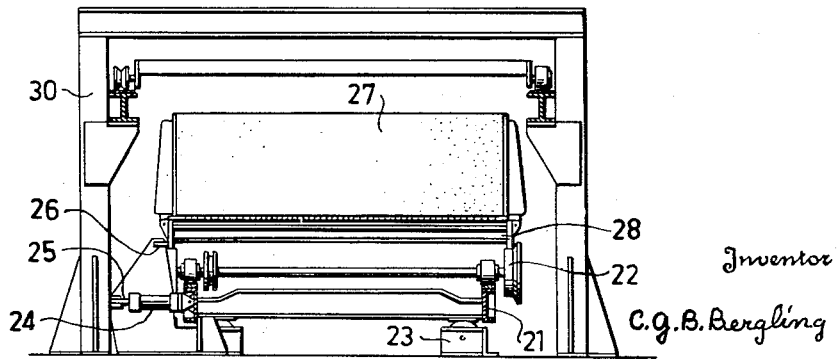

The invention will be described more in detail hereinafter with reference to the accompanying drawing illustrating an embodiment of the cutting device according to the invention. The drawing shows a mould bottom with a light-weight concrete block being inserted for cutting. In the drawing FIG. 1 shows a side elevation of the device;
FIG. 2 is a view of the device as seen from the top;
FIG. 3 is a vertical section of the device;
FIG. 4 is a side elevational view and FIG. 5 is a plan view showing the relationship of a fixture, the mold bottom and a cutting wire holder;
FIG. 6 is an end elevational view showing the relationship of a fixture, a cutting wire and its holder and
FIG. 7 is a perspective view showing the relationship of a fixture, the mold bottom, a cutting wire and its holder.

The device according to the drawing comprises two parallel beams or tracks 1 supporting a trolley 2. The trolley can be pulled to and fro on the tracks 1 by means of chains 13. The chains 13 run over chain wheels 14, 15, the latter of which via a gear being driven by an electric motor 16. The trolley 2 is provided with a cross beam 3, to which are attached a number of cutting wires 4, in the case illustrated six wires. The other ends of the wires are fixed at holders (runners) 5 movably arranged in a fixture 6. The said fixture consists of a frame 17, on which are provided a number of spacers 19, supporting a number of ribs 18 disposed at such a mutual distance that the cutting wire may pass between two adjacent ribs. The wire holders are inserted beneath the ribs 18 and may then under the action of the wires be readily pulled to and fro, between the spacers. The fixture is suspended in arms 7 pivoting about axes 20 and operated by means of compressed air pistons 9, the piston rods 8 of which are mounted at the arms. At the opposite end of the cutting device there is a similar fixture 10 suspended in arms 11 operated by compressed air pistons 12.

In addition the cutting device comprises a roller way consisting of longitudinal beams 21, to which are attached wheels or rollers 22. The beams 21 rest on rollers 23 in such a manner that the entire roller way may be displaced laterally by means of two stationary mounted hydraulic or pneumatic cylinders 24, the rear ends of which are attached to a beam 21 and the piston rods 25 of which are attached to a stationary support 30. The lateral movement of the roller way stops, when a couple of check points on the mould bottom come into contact with a couple of stop pieces 26, which are set in such a manner that the mould bottom will then be in exactly the right position relative to the fixtures.

When a moulded light-weight concrete block is to be cut, the mould bottom on which the block has been moulded is inserted in the cutting device, the walls of the mould having been removed so that the block 27 rests freely on the mould bottom 28. The mould bottom consists of ribs having the same width and being spaced at the same mutual distance as the ribs in the fixtures 6 and 10. In order to prevent the liquid light concrete mass to escape through the slots between the ribs these are presealed in a manner known per se, for example by means of paraffin or a thin foil of plastic, paper or the like. The lateral position of the roller way is adjusted so that the position of the mould bottom is fixed by the stop pieces 26. The two fixtures 6 and 10 which were lifted up during the insertion of the mould bottom, are now brought down so as to form extensions to the mould bottom. The trolley 2 is now moved in the direction to the right in the figures, the cutting wires in a manner known per se cutting the light-weight concrete block while the wire holders under the action of the pull from the cutting wires slide from the fixture 6 over to the mould bottom. The movement of the trolley continues so far that the light-weight concrete block is totally cut through and then some distance further, so that the wire holders slide from the mould bottom over to the fixture 10. The two fixtures are now lifted up, the wire holders remaining in their position in fixture 10 and thus in the right position for the next cutting operation, provided that the following light-weight concrete block is to be cut in the same way. The mould bottom with the cut up block is then rolled out of the cutting device and a new mould bottom and light-weight concrete block may be inserted. To prevent the wire holders from sliding out of the fixture through their own weight when it is lifted up, it is possible below the ribs of the fixtures to provide rubber strips, for example, on which the holders slide with a certain friction.

Referring to FIGS. 4 and 7 it is seen that the wire holder 5 is provided with knives 29 at each end thereof which extend into the space between the ribs 18 and serve to guide the holder. As appears in FIG. 4 a support 31 prevents the wire holders from falling away from the fixture when the tension on the cutting wires is relaxed. FIG. 4 also shows a wire holder in broken lines passing from the fixture 6 to the mold bottom 28.

What is claimed is:

A cutting device for light weight concrete comprising an elongated stationary supporting structure, two fixtures each consisting essentially of a plurality of spaced apart parallel ribs extending longitudinally of said structure, said fixtures being spaced apart lengthwise of said structure, a mould bottom consisting essentially of a plurality of spaced apart ribs, means for moving said mould bottom into and out of said structure and positioning it with its ends adjacent to said fixtures and with its ribs alined with the ribs of said fixtures, said fixtures being movable into and out of alinement with said mould bottom to permit the movement of said mould bottom into and out of said structure past the normal positions of said fixtures, said means for moving said mould bottom into and out of said structure comprising rollers supported by the base of said structure, a carriage mounted to move on said rollers, rollers carried by said carriage for supporting the mould bottom and means carried by said structure for moving said carriage laterally on said first named rollers to align the ribs of a mould bottom supported thereon with the ribs of said fixtures, a plurality of wire holders each positioned under a space between two adjacent ribs of one of said fixtures, a cutting wire attached to each of said wire holders and extending upwardly between said ribs, a trolley supported by said structure and attached to the upper ends of said cutting wires, means for moving said trolley lengthwise of said structure whereby said cutting wires are moved from the spaces between the ribs of one of said fixtures, through the spaces between the ribs of said mould bottom and into the spaces between the ribs of the other of said fixtures and said wire holders are moved from their position under one of said fixtures along under said mould bottom to a position under the other of said fixtures and means for removing said mould bottom from said structure.

References Cited by the Examiner
UNITED STATES PATENTS

| | | | |
|---|---|---|---|
| 874,366 | 12/07 | Layfield et al. | 25—41.2 |
| 1,118,540 | 11/14 | Ellingson | 25—41.2 |
| 2,043,956 | 6/36 | Camerata | 25—30 |
| 2,694,846 | 11/54 | Olsson et al. | 25—105 |
| 2,978,777 | 4/61 | Carlsson et al. | 25—108 |
| 3,059,306 | 10/62 | Hamilton | 25—106 |

MICHAEL V. BRINDISI, *Primary Examiner.*

ROBERT F. WHITE, *Examiner.*